G. S. WILSON.
THERMOMETER.
APPLICATION FILED MAY 20, 1915.
1,197,703.
Patented Sept. 12, 1916.
2 SHEETS—SHEET 1.
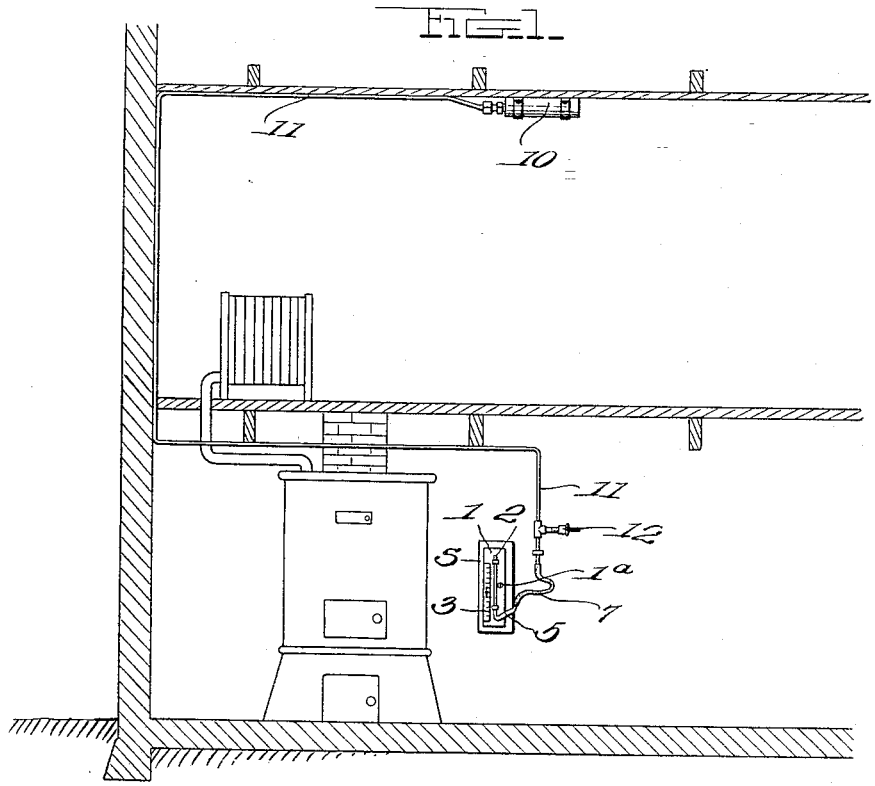
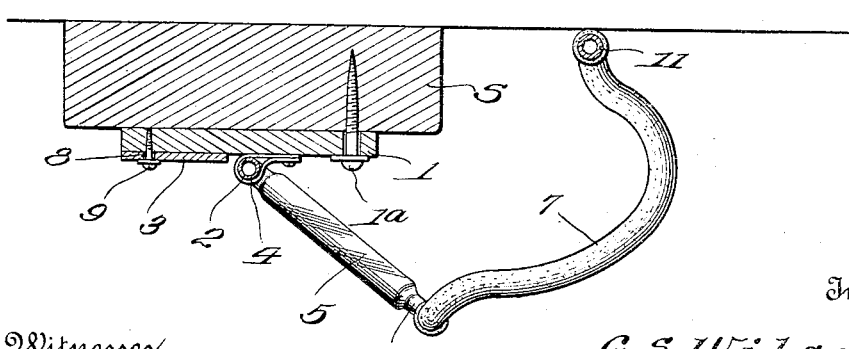
Witnesses
J. R. Pierce
Inventor
G. S. Wilson.
by H. B. Willson &co.
Attorneys G. S. WILSON.
THERMOMETER.
APPLICATION FILED MAY 20, 1915.
1,197,703.
Patented Sept. 12, 1916.
2 SHEETS—SHEET 2.
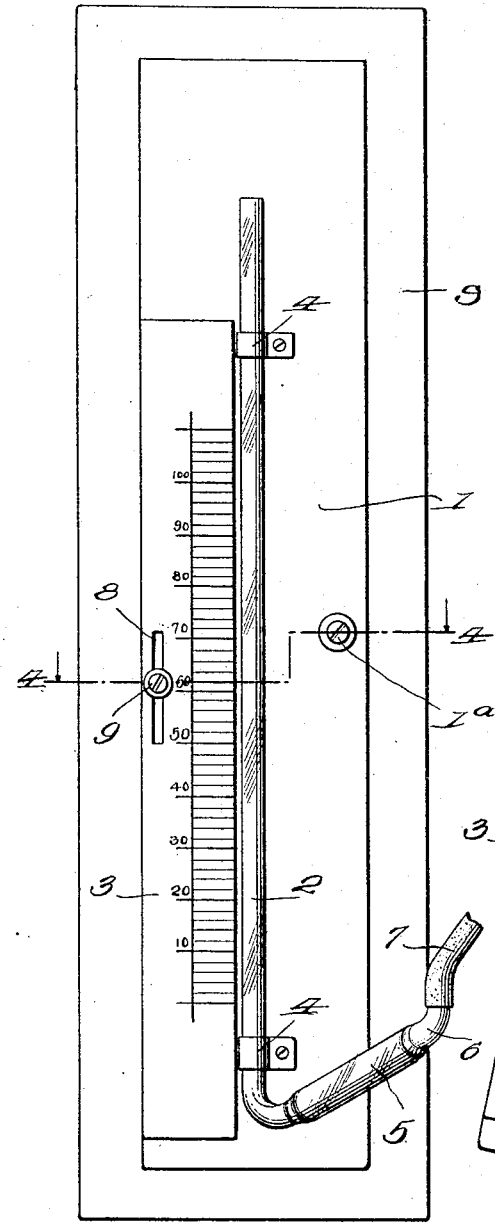
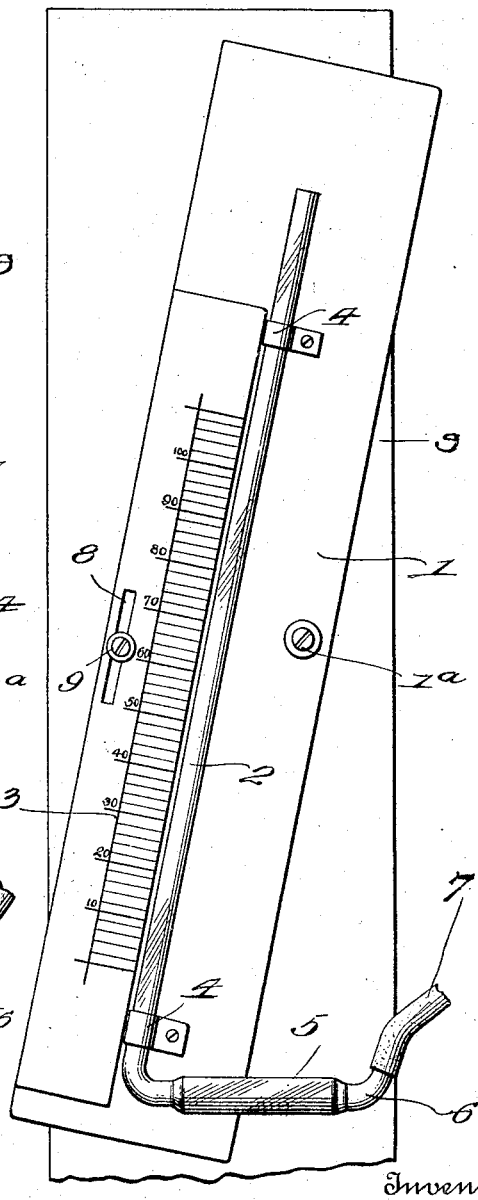
Witnesses
J. R. Pierce
Inventor
G. S. Wilson.
by H. R. Wilson & Co.
Attorneys

UNITED STATES PATENT OFFICE.

GEORGE S. WILSON, OF KENDALLVILLE, INDIANA.

THERMOMETER.

1,197,703.  Specification of Letters Patent.  Patented Sept. 12, 1916.

Application filed May 20, 1915. Serial No. 29,367.

*To all whom it may concern:*

Be it known that I, GEORGE S. WILSON, a citizen of the United States, residing at Kendallville, in the county of Noble and State of Indiana, have invented certain new and useful Improvements in Thermometers; and I do declare the following to be a full, clear, and exact description of the invention, such as will enable others skilled in the art to which it appertains to make and use the same.

This invention relates to improvements in apparatus for indicating the temperature of the various rooms of a building which shall enable the engineer or janitor in charge to know and control the temperature of the several rooms.

The object of the invention is to so construct an apparatus of this character having a thermometer connected therewith which may be tilted to vary the weight upon the mercury and in which the scale of the thermometer is also adjustable to adapt the thermometer to be given a certain tilt, then note the temperature in the room with which it is connected, then slide the scale to the same temperature so as to set the apparatus.

Another object is to provide means for supplying the apparatus with air to meet changes caused by different temperatures owing to the expansion of air.

With these and other objects in view the invention consists of certain novel features of construction, and the combination and arrangement of parts as will be hereinafter more fully described and claimed.

In the accompanying drawings: Figure 1 represents a vertical sectional view of a building showing this improved apparatus applied; Fig. 2 is a front elevation of a thermometer constructed in accordance with this invention and with the parts in one position; Fig. 3 is a similar view showing the parts in a slightly different position; Fig. 4 is a horizontal section taken on the line 4—4 of Fig. 2.

In the embodiment illustrated a thermometer is shown comprising a base 1 having the usual glass tube 2 mounted thereon with a scale 3 arranged at one side thereof. This tube 2 herein shown is mounted for rotary movement, clips 4 being here shown connecting said tube with the base 1. This tube 2 which is designed to contain mercury or other expansible or contractible material suitable for indicating the temperature is open at its upper end and is provided at its lower end with an angular tubular extension 5 here shown disposed obliquely, being inclined upwardly and outwardly from the lower end of said tube 2 and the free end thereof is shown reduced as at 6 and with which is connected a flexible tube 7 preferably of rubber.

The scale 3 which is mounted at one side of the tube 2 is longitudinally adjustable relatively to said tube and is here shown provided with a longitudinally extending slot 8 through which a headed stud 9 carried by the board 1 projects and forms a guide as well as a stop for limiting the movement of said scale in opposite directions, it of course being understood that when the ends of the slot abut this stud the movement of the scale will be stopped. This thermometer is designed to be arranged in the furnace room of a building or at any other desired point where it may be observed by the person in charge of the building and the tube 2 is made rotatable to provide for the lateral tilting of the thermometer for varying the weight of the mercury which is contained within the extension 5 of said tube, the flexible pipe 7 connected with said extension permitting this tilting movement of the thermometer which is accomplished by swinging the base 1 on a pivot 1ª by which it is connected to a support, the latter being here shown in the form of an upright board or wall S. This pivot 1ª is here shown in the form of a set screw disposed midway the ends of the base 1 and this pivot is made sufficiently tight so that when the base is adjusted on its support S, it will be held by friction in such position. The scale 3 is made adjustable so that when the thermometer has been given a certain tilt the scale may be moved longitudinally relatively to the tube 2 thereof for setting the apparatus.

An air-tight tank 10 composed of suitable heat conducting material is designed to be mounted in the room, the temperature of which is to be regulated and may be supported therein in any suitable manner and by any suitable means. Leading from one end of this tank 10 is a small hollow wire or pipe 11 which leads to the room in which the thermometer is located and is connected with the flexible tube or pipe 7. This air pipe 11 is provided intermediately of its ends with an air valve 12 to provide for the pumping of air into the apparatus to adapt it to meet changes caused by different temperatures on account of the expansion of air.

The base 1 with the mercury tube 2 mounted thereon and having the laterally extending upwardly inclined hollow arm 5 at its lower end is designed to be tilted laterally to vary the pressure of the mercury in the tube 2 and thereby provide for the positioning of the mercury at the desired height in said tube on the setting of the apparatus, it being understood that when the hollow arm 5 which contains the mercury is lowered into the position shown in Fig. 3, that the pressure of the mercury in the tube 2 will be less, causing the mercury to drop in said tube and flow back into the tube 5 and when the tube is disposed upwardly as shown in Fig. 2 the mercury in the arm 5 will flow downwardly and upwardly into the tube 2 owing to the pressure exerted by the weight of the mercury in said arm 5. When the base 1 and the tube 2 carried thereby have been tilted to cause the mercury to stand at the desired height in the tube 2 the scale 3 is adjusted longitudinally to position the desired indicating mark or number thereon opposite the mercury in the tube and is frictionally held in adjusted position by the engagement of the head of the stud 9 with the outer face of the scale. Hence after the attendant has set the thermometer as desired to indicate the temperature in the room at a remote point to be controlled, he can tell by a glance at the thermometer in his room what said temperature is and consequently may control his furnace accordingly.

In the use of this apparatus the glass or tubular extension 5 is partly filled with mercury and the expansion of the air within the tank 10 caused by the rise in temperature of the room in which said tank is placed exerts pressure through the pipe 11 and tube 7 on the mercury contained in the extension 5 and tube 2 thereby causing the mercury to rise along the scale of the thermometer and enable the person in charge to readily see what the temperature is in the room in which the tank 10 is located. It is of course understood that when the temperature in the room falls the air in the tank will contract and thus the pressure in pipe 11 will be relieved and the mercury in tube 2 will fall in the manner usual with thermometers.

The small hollow pipe or wire 11 is sufficiently flexible to permit it to be positioned at any point for supporting it in the manner usually employed for wiring buildings, either by stringing it along the ceiling out of the way or in the partitions of the rooms leading from the room in which the tank 10 is located to the room in which the thermometer is located.

The upper end of the thermometer tube 2 is left open to prevent any resistance being offered to the rise of the mercury in said tube By providing one of these indicators for each room and arranging the thermometers thereof in the room occupied by the janitor it is obvious that the janitor may quickly determine the temperature in the various rooms without the necessity of leaving his post

I claim as my invention:

1. A thermometer including a mercury containing tube and an indicating scale, a hollow arm extending upwardly at an oblique angle from the lower end of said tube, said tube being mounted for lateral tilting movement to vary the height of the mercury in the tube.

2. In a thermometer the combination of a supporting base pivotally mounted intermediate of its ends to provide for the tilting movement of said base, a mercury tube and an indicating scale carried by said base, a hollow angularly disposed arm projecting laterally from the lower end of said tube and communicating therewith, and a pipe connected with the free end of said arm and adapted to be connected with an air containing tank disposed at a point remote from said thermometer.

3. The combination with a pivotally mounted supporting base, a mercury tube rotatably mounted on said base and having an upwardly inclined hollow arm at its lower end communicating therewith, a scale having a longitudinal slot therein mounted on said base adjacent said tube, a headed element extending through said slot for adjustably connecting said scale to the base, and a flexible pipe connected with the free end of said hollow arm and adapted to be connected with an air container, the temperature of which said thermometer is designed to indicate.

In testimony whereof I have hereunto set my hand in presence of two subscribing witnesses.

GEORGE S. WILSON.

Witnesses:
CLARENCE E. CONORD,
LEANDER ZEM.

Copies of this patent may be obtained for five cents each, by addressing the "Commissioner of Patents. Washington, D. C."